United States Patent
Xiong

(10) Patent No.: US 7,123,769 B2
(45) Date of Patent: Oct. 17, 2006

(54) SHOT BOUNDARY DETECTION

(75) Inventor: Wei Xiong, Fremont, CA (US)

(73) Assignee: ArcSoft, Inc., Fremont, CA (US)

(*) Notice: Subject to any disclaimer, the term of this patent is extended or adjusted under 35 U.S.C. 154(b) by 826 days.

(21) Appl. No.: 10/008,338

(22) Filed: Nov. 9, 2001

(65) Prior Publication Data

US 2003/0091235 A1 May 15, 2003

(51) Int. Cl.
*G06K 9/48* (2006.01)
(52) U.S. Cl. ............... 382/199; 348/700; 375/240.01; 382/165; 382/170; 382/203
(58) Field of Classification Search ............... 348/700, 348/701, 722; 382/155, 156, 157, 160, 165, 382/173, 225, 236, 170, 203
See application file for complete search history.

(56) References Cited

U.S. PATENT DOCUMENTS

| | | | | |
|---|---|---|---|---|
| 5,635,982 A * | 6/1997 | Zhang et al. | ........... | 348/231.99 |
| 6,072,542 A * | 6/2000 | Wilcox et al. | ............... | 348/722 |
| 6,137,544 A * | 10/2000 | Dimitrova et al. | ........... | 348/700 |
| 6,195,458 B1 * | 2/2001 | Warnick et al. | ............. | 382/173 |
| 6,393,054 B1 * | 5/2002 | Altunbasak et al. | ........ | 382/173 |
| 6,606,409 B1 * | 8/2003 | Warnick et al. | ............. | 382/173 |
| 6,782,049 B1 * | 8/2004 | Dufaux et al. | ......... | 375/240.01 |
| 6,845,176 B1 * | 1/2005 | Sezan | ......................... | 382/168 |
| 6,870,956 B1 * | 3/2005 | Qi et al. | ..................... | 382/170 |

OTHER PUBLICATIONS

Kitchen, et al., "Gray-Level Corner Detection," Pattern Recognition Letters, vol. 1, No. 2, pp. 95-102, Dec. 1982.
Xiong, et al., "Efficient Scene Change Detection and Camera Motion Annotation for Video Classification," Computer Vision and Image Understanding, vol. 71, No. 2, pp. 166-181, Aug. 1998.
Xiong, et al., "Automatic Video Data Structuring Through Shot Partitioning and Key-Frame Computing," Machine Vision and Application, pp. 51-65, 1997.
Jain, Anil K., *Fundamentals of Digital Image Processing*, p. 362, 1989.
Gonzalez et al., *Digital Image Processing*, pp. 416-438, Sep. 1993.

* cited by examiner

*Primary Examiner*—Bhavesh M. Mehta
*Assistant Examiner*—Gregory Desire
(74) *Attorney, Agent, or Firm*—Patent Law Group LLP; David C. Hsia

(57) ABSTRACT

A video segment is processed to identify frames representing shot boundaries in the video segment. Initially, a partial block-based comparison technique is used to determine the amount of change (i.e., a first difference) that occurs between a pair of distant (i.e., not consecutive) frames. Additionally, edge and/or color differences are computed between the pair of frames to confirm that a change has occurred. If the change is confirmed, a step variable technique is used to locate the change between two consecutive frames between the distant frames. If the partial block-based comparison technique obtains a difference between the consecutive frames that exceeds the first threshold, then an abrupt change is detected. Otherwise, the edge and/or color differences are used to determine whether a gradual transition has occurred.

34 Claims, 10 Drawing Sheets

SHOT BOUNDARY DETECTION

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Field of the Invention

The invention is generally related to digital image processing, and, in particular, is related to detecting video shot boundaries.

2. Description of Related Art

Video cameras are becoming more popular today, as they become more widely available, at lower prices. A video camera records sequential images within "frames." A frame is a representation of an image at an instant of time. Typically, each frame represents the image at a different instant in time. When several frames are recorded, at sequential instances in time, and are shown to the human eye in quick succession, the human eye is able to see motion in the video segment (i.e., a sequence of frames). For example, video (i.e., moving pictures) normally consists of a lot of motion, including object motion, such as a bird flying, and camera motion, such as camera panning, zooming, and tilting.

For various types of video processing (e.g., to enable video classification to search for videos or to enable searching for a video segment within a video), it is useful to segment a video into physical units, which are referred to as "shots." A shot is a video segment that represents one continuous action. Shots may be clustered to form more semantically significant units, such as scenes or sequences. These scenes may then be used for story-based video structuring (e.g., scenes may be organized into a movie format). The shots may be described by one or more representative frames, which may be referred to as key frames. Once key frames are identified, the key frames may be used to classify videos, which enables searching for a particular video (e.g., when renting videos), or may be used for searching for a particular video segment (e.g., a video segment that shows a bird flying) within a video. In one embodiment, a shot is an unbroken sequence of frames captured with one camera, and a shot boundary is the border between two shots. A shot boundary may occur at an abrupt break, which appears as an instantaneous change, or at a gradual transition. One type of gradual transition is a fade in, fade out effect in which the camera focus changes from, for example, a building scene, to, for example, a person scene. Then, during the gradual transition, the building may appear to fade out, while the person may appear to fade into the image.

In some cases, individuals will review a video and manually select shots and representative key frames. This is a very time consuming process. Alternative techniques offer automated processes for identifying shots and selecting key frames, but these techniques typically also find many false alarms (i.e., they identify a pair of frames as a shot boundary when it is not actually a shot boundary). One example is the step variable technique described in "Efficient Scene Change Detection and Camera Motion Annotation for Video Classification," by Wei Xiong and John Chung-Mong Lee, Computer Vision and Image Understanding, Vol. 71, No. 2, pp. 166–181, August 1998 and "Automatic Video Data Structuring Through Shot Partitioning and Key-Frame Computing," Wei Xiong, John Chung-Mong Lee, and Rui-Hua Ma, Machine Vision and Applications, Springer-Verlag, 10: 51–65, 1997, each of which is entirely incorporated by reference herein.

SUMMARY

A video segment is processed to detect shot boundaries and output key frames.

According to one embodiment of the invention, a method for detecting a shot boundary is provided. A first difference between a first frame and a second frame is determined using a partial block-based comparison technique. It is determined whether the first difference exceeds a threshold. When the first difference exceeds the threshold, an edge difference is computed between the first frame and the second frame and a color difference is computed between the first frame and the second frame. Then, it is determined whether the first frame and the second frame comprise a shot boundary based on the value of the edge difference or color difference.

According to another embodiment of the invention, a method for detecting a shot boundary is provided. A first difference is determined between a first frame and a second frame using a partial block-based comparison technique. Whether the first difference exceeds a threshold is determined. When the first difference exceeds the threshold, an edge difference is computed between the first frame and the second frame. Then, whether the first frame and the second frame comprise a shot boundary based on the edge difference is determined.

According to yet another embodiment of the invention, a method for detecting a shot boundary. A first difference between a first frame and a second frame is determined using a partial block-based comparison technique. Whether the first difference exceeds a threshold is determined. When the first difference exceeds the threshold, a color difference is computed between the first frame and the second frame. Then, whether the first frame and the second frame comprise a shot boundary based on the color difference is determined.

According to a further embodiment of the invention, a method for detecting a shot boundary is provided. A first difference between a first frame and a distant frame is computed using a partial block-based comparison technique. It is determined whether the first difference exceeds a first threshold. If the first difference exceeds the first threshold, an edge difference or a color difference is computed between the first frame and the distant frame. It is determined whether a candidate shot boundary exists between the two frames based on the edge difference or the color difference. When a candidate shot boundary exists, a step variable technique is used to locate the actual boundary between two consecutive frames.

According to another embodiment of the invention, a system is provided that includes a computer including a processor and a memory, a sequence of frames stored in the memory, and a program comprising instructions stored in the memory of the computer. Execution of the instructions by the processor of the computer determine a first difference between a first frame and a second frame using a partial block-based comparison technique; determine whether the first difference exceeds a threshold; and, when the first difference exceeds the threshold, compute an edge difference between the first frame and the second frame, compute a color difference between the first frame and the second frame, and determine whether the first frame and the second frame comprise a shot boundary based on the value of the edge difference or color difference.

According to yet another embodiment of the invention, a system is provided that includes a video camera recording a sequence of frames, a computer with a processor and a memory, wherein the sequence of frames is stored in the memory of the computer, and means for detecting a shot boundary based on a color difference or an edge difference between a first frame and a second frame in the sequence of frames.

According to a further embodiment of the invention, a system is provided that includes a camera including a processor and memory, a sequence of frames captured by the camera and stored in the memory, and a program stored in the memory, wherein the program is executed by the processor to detect a shot boundary based on a color difference or an edge difference between a first frame and a second frame in the sequence of frames.

According to another embodiment of the invention, a computer readable storage medium encoded with software instructions. Execution of the instructions determines a first difference using a partial block-based comparison technique between a first frame and a second frame and determines whether the first difference exceeds a threshold. Additionally, when the first difference exceeds the threshold, execution of the instructions, computes an edge difference between the first frame and the second frame, computes a color difference between the first frame and the second frame, and determines whether the first frame and the second frame comprise a shot boundary based on the value of the edge difference or color difference.

The invention is better understood upon consideration of the detailed description below, and the accompanying drawings.

BRIEF DESCRIPTION OF THE DRAWINGS

Use of the same reference symbols in different figures indicates similar or identical items.

DETAILED DESCRIPTION

Figure 1:
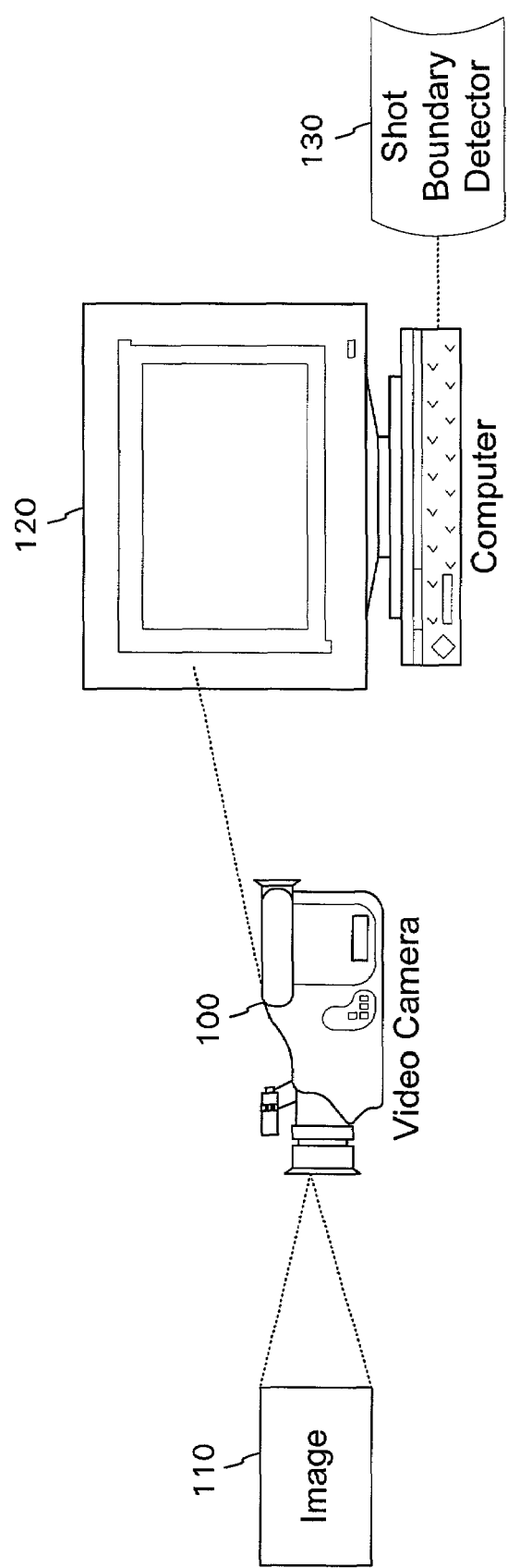
FIG. 1 is a block diagram that illustrates components that may be used in one embodiment of the invention.

In accordance with an embodiment of the invention, a computer programmed with software (referred to herein as "shot boundary detector") processes a video segment to identify a pair of consecutive frames representing a shot boundary in a video segment. Initially, the shot boundary detector uses a partial block-based comparison technique to determine the amount of change (i.e., a first difference) that occurs within a sequence of frames bordered by a pair of distant (i.e., not consecutive) frames in one embodiment. If the first difference exceeds a first threshold, the shot boundary detector computes an edge difference and/or a color difference between the pair of frames to confirm that a change has occurred. The edge difference reflects a comparison of edges (e.g., borders between different colors) detected in each frame. The color difference reflects a comparison of the colors contained in each frame.

If the change is confirmed, the shot boundary detector uses a binary search to identify two consecutive frames within a sequence of frames bordered by the distant frames that form a shot boundary. For these two consecutive frames, the shot boundary detector uses the partial block-based comparison technique to determine the amount of change (i.e., a second difference) that occurs between the frames. If the second difference exceeds the first threshold, then an abrupt change is detected. If the second difference exceeds a second threshold, then a gradual transition has occurred. In addition, the shot boundary detector can use the edge and/or color differences to determine whether a gradual transition has occurred.

If neither an abrupt break nor a gradual transition is detected, the shot boundary detector selects a different pair of frames and performs the comparisons again to try and locate a shot boundary.

In particular, the shot boundary detector of the invention, rather than comparing every consecutive pair of frames to detect a shot boundary, compares only selected frames (e.g., compares distant frames, and if the distant frames are different, the shot boundary detector performs a binary search within a sequence of frames bordered by the distant frames to locate consecutive frames that form a border of a shot boundary). Also, to reduce the number of shots that are incorrectly identified (i.e., false alarms), the shot boundary detector confirms that a shot boundary has been found by analyzing edge and/or color differences between a pair of frames.

A video segment includes a sequence of frames. Each frame represents an image (simplistically, this can be viewed as a picture taken with a camera). If a sequence of frames are taken of an image that is not moving, with a video camera that is not moving, each pair of consecutive frames will be almost exact (note there may be some change due to hand jitter and other factors).

On the other hand, if the sequence of frames are taken of a moving object, or the video camera is moving, or both, consecutive frames capture different images. It is useful to identify shot boundaries within the sequence of frames.

FIG. 1 is a block diagram that illustrates components that may be used in one embodiment of the invention. In one embodiment, a video camera 100 records an image 110. The video camera 100 and/or the image may be in motion. The video camera 100 includes data storage that stores the video segment. The video segment is transferred to a computer 120, which includes a shot boundary detector 130 stored, for example, on a hard drive of the computer 120 or a CD-ROM (compact disc-read only memory) inserted into the CD-ROM drive of the computer 120. In other embodiments, the shot boundary detector 130 may be implemented as a hardware shot boundary detector or as a combination of hardware and software.

In one embodiment, the video camera 100 is a digital video camera. Digital video cameras offer many advantages. For example, digital images are easier to manipulate and easier to distribute over electronic media (e.g., the Internet or e-mail). In another embodiment, the video camera 100 is an analog video camera using film to record images. The film can be converted to digital images for processing with the shot boundary detector 130. In yet another embodiment, a still picture camera, rather than video camera 100, is used to take a series of pictures that are either digitally recorded or converted to digital images. The series of pictures are transformed into a video segment that may be processed using the shot boundary detector 130.

The shot boundary detector 130 works with both gray scale or color images. For example, each image can be a two-dimensional array of RGB (red-green-blue) or YUV pixel values representing color pixels. YUV is defined by the Commission International de L'Eclairage (CIE), which is an international committee for color standards. YUV is often used in Phase Alternation Line (PAL) television (an analog television display standard), where the luminance and the chrominance are treated as separate components. In YUV systems, a luminance signal (represented with "Y") typically occupies the maximum bandwidth, while chrominance signals (represented by "U" and "V") typically occupy half the bandwidth each (i.e., because the eye is less sensitive to color detail).

In one embodiment, the images are represented in Microsoft Windows™ 24-bit BITMAP format. In this format, each pixel has three adjacent bytes for Blue, Green, and Red channels respectively. In one embodiment, each of the source images is W (i.e., width) by H (i.e., height) pixels. For example, the dimensions may be 720×480 pixels or 352×288 pixels.

Figure 2:
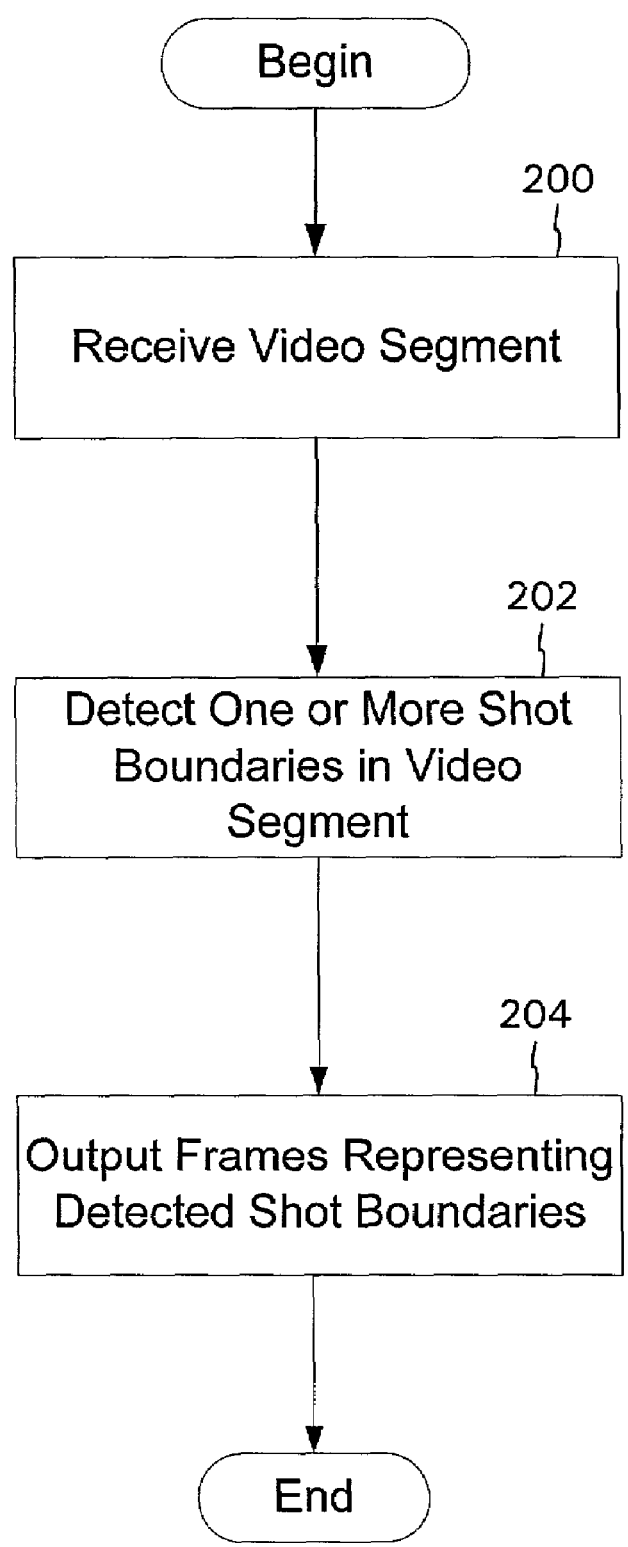
FIG. 2 is a flow diagram that illustrates processing of a video segment in one embodiment of the invention.

FIG. 2 is a flow diagram that illustrates processing of a video segment in one embodiment of the invention. In particular, block 200 represents the shot boundary detector 130 receiving a video segment. Block 202 represents the shot boundary detector 130 detecting one or more shot boundaries in the video segment. In one embodiment, the shot boundary detector 130 detects shot boundaries based on color or edge differences between selected frames. Block 204 represents the shot boundary detector 130 outputting frames representing detected shot boundaries. The frames may be output to local data storage, remote data storage, to a user monitor, to television transmitters, or to another device. The digital images may be converted to analog images. Also, the frames may be output to other software for additional processing.

In an alternative embodiment, as video camera 100 captures images, the video camera 100 transfers data directly to computer 120, which has sufficient memory to hold the data. The computer 120 processes the data in real time to detect shot boundaries, and, for example, transfers the data to storage, to a user monitor, or to television transmitters.

The computer 120 may be a personal computer, workstation, laptop computer, personal digital assistant, mainframe computer, or other processing device. Also, the computer 120 may be a general purpose or a special purpose computer. For example, computer 120 may be a computer having a Pentium® chip, available from computer vendors such as International Business Machines Corporation, Inc., of Armonk, N.Y. or Apple Computer, Inc. of Cupertino, Calif. The computer 120 may include an operating system, such as Microsoft® Windows® 2000 from Microsoft Corp. of Redmond, Wash.

Given ongoing advances in the data processing industry, it is conceivable that the storage and processing features illustrated in FIG. 1 may be incorporated on integrated circuits, microprocessors, and other electronics small enough to fit within a handheld video camera. Therefore, the shot boundary detector 130 may be incorporated into the video camera 100 as software, hardware, or a combination of hardware and software. Nevertheless, merely reducing the size or altering the location of elements of this invention does not depart from the spirit and scope of the invention.

Figure 3A:
FIGS. 3A–3E illustrate a series of frames that depict a fade in and fade out effect in a video segment in one embodiment of the invention.
Figure 3B:
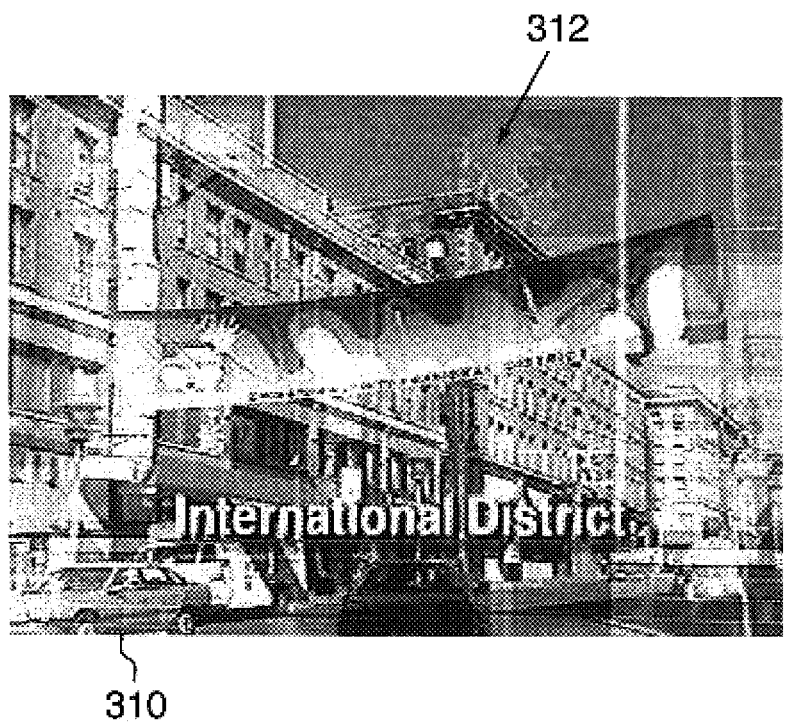
Figure 3C:
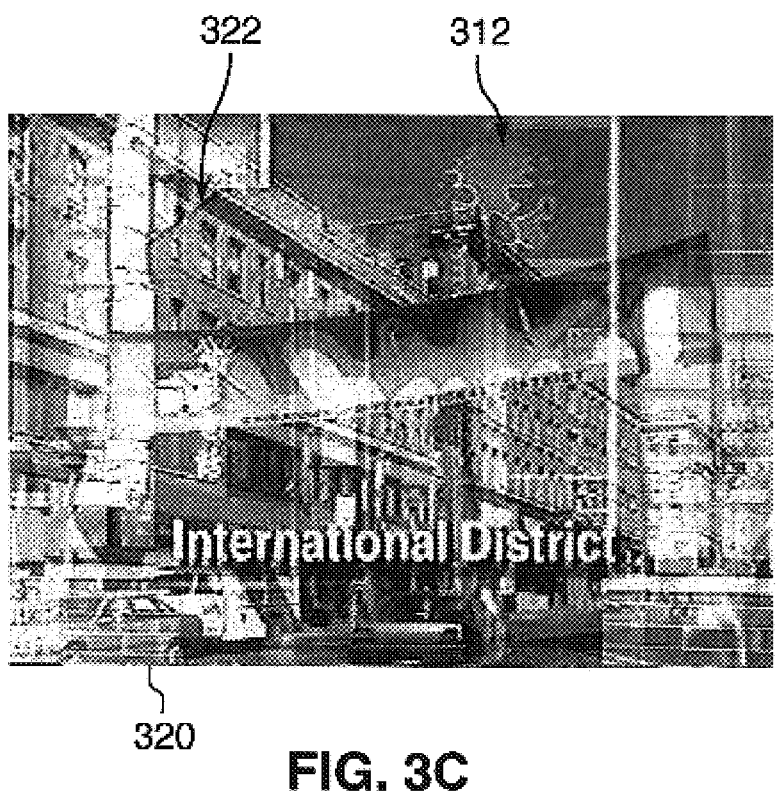
Figure 3D:
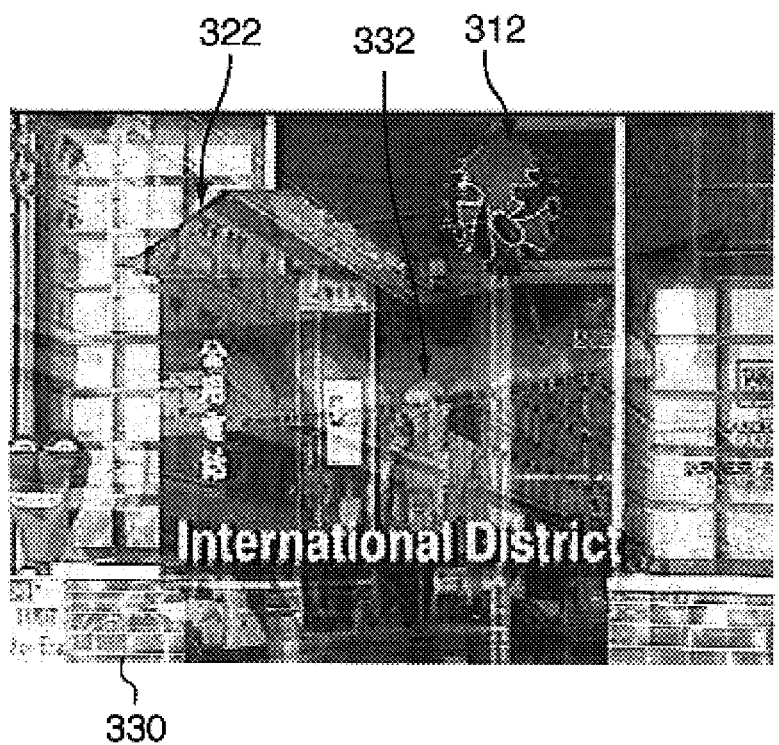

FIGS. 3A–3E illustrate a series of frames that depict a fade in and fade out effect in a video segment. Frame 300 in FIG. 3A represents an initial frame depicting a building along a street with moving cars. The image captured by frame 300 contains a label, "International District." Frame 310 in FIG. 3B represents the next frame in the sequence. In frame 310, a lantern 312 is visible. The lantern 312 is part of the image that is "fading in," while the building scene is "fading out." Frame 320 in FIG. 3C represents the next fame in the sequence, and, in this frame, the lantern 312 is seen more clearly, and another structure 322 is visible. Frame 330 in FIG. 3D illustrates more of the image that is fading in, such as more of structure 322 and individual 332. In frame 340 in FIG. 3E, the fade in, fade out effect is complete, and a close up of a person using a public telephone is seen. The image captured by frame 340 contains the label, "International District," which was also seen in each of the frames illustrated in FIGS. 3A–3E.

Figure 4A:
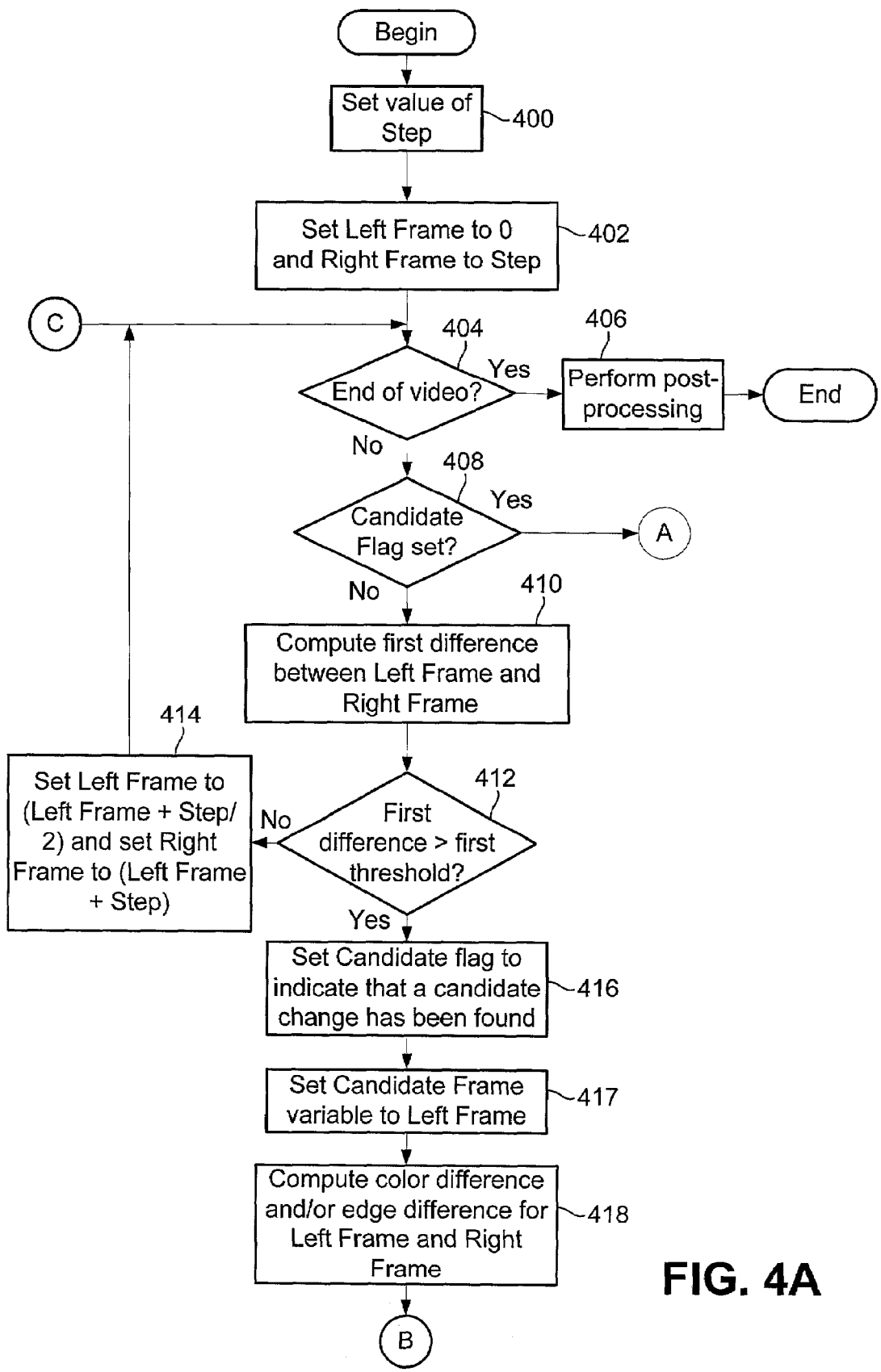
FIGS. 4A–4B are flow diagrams that illustrate shot boundary detection processing in one embodiment of the invention.
Figure 4B:
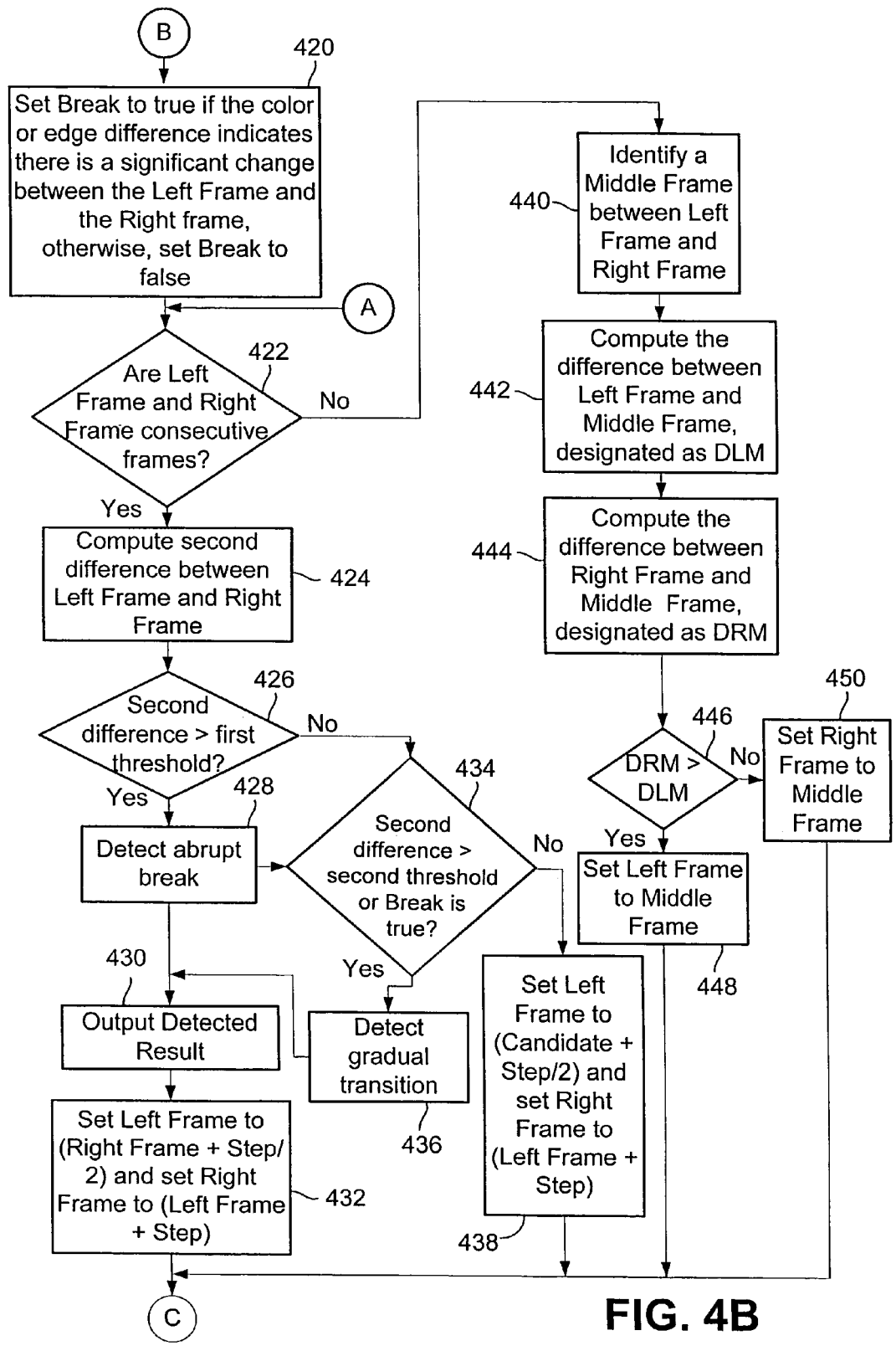

FIGS. 4A–4B are flow diagrams that illustrate shot boundary detection in one embodiment of the invention. In block 400, the shot boundary detector 130 sets the value of a variable called "step." The step variable technique is described further in "Efficient Scene Change Detection and Camera Motion Annotation for Video Classification," by Wei Xiong and John Chung-Mong Lee, Computer Vision and Image Understanding, Vol. 71, No. 2, August 1998, pp. 166–181, which is entirely incorporated by reference herein.

The step variable technique is used to "step" through a video segment, and, in particular, to select pairs of frames to compare. This avoids the need to look at all consecutive pairs of frames. Instead, a first frame is selected (e.g., at the beginning of the video segment), and a second frame is selected a step away (e.g., if the step value is set to 50 frames, then the second frame is 50 frames from the first frame). The first and second frames are compared to determine how different they are. If no significant change is found, then the next comparison selects frames that are incremented using the step value. In one embodiment, the newly selected frames are a half step forward. For example, if the step value is set to 50 frames, the first frame (i.e., the left frame) is set to 0, and the second frame (i.e., the right frame) is set to 49, then, the newly selected first frame is set to 25, while the newly selected second frame is set to 74.

On the other hand, if a significant change is found, then the shot boundary detector 130 uses a binary search to locate consecutive frames (within a sequence of frames starting with the first frame and ending with the second frame) that are most different. These frames signify a shot boundary.

In one embodiment, the step value is defined by an individual, such as a user or system administrator, via, for example, a user interface (i.e., it is user-defined). Moreover, in one embodiment, the step value is set to either the minimum of the shot length or the maximum gradual transition length. The shot length is equivalent to all or a portion of the video segment. For example, the shot length may be set to 60 frames, while the video segment includes 1000 frames. The maximum gradual transition length is the number of frames required for a fade in, fade out effect or other transition effect, such as wipe or box out, to take place. A wipe refers to a transition between shots in which a line passes across the screen on which the shots are being played.

A box out refers to a new shot that appears as a small box in the center of a screen and that gradually grows larger to cover the entire screen. The maximum gradual transition length may be set to 50 frames in one embodiment.

In another embodiment, the step value is preset to a default value, such as 50 frames. In a further embodiment, the step value is set by the shot boundary detector 130 based on various factors, such as camera and object motion in the video. In one embodiment, the more motion a video sequence contains, the smaller the step value is. In another embodiment, the step value may be learned from the history of shot boundary detection. For example, initially, a small step value may be used. After detecting some shot boundaries, the step value may be dynamically adjusted based on the observed shot lengths.

Figure 5A:
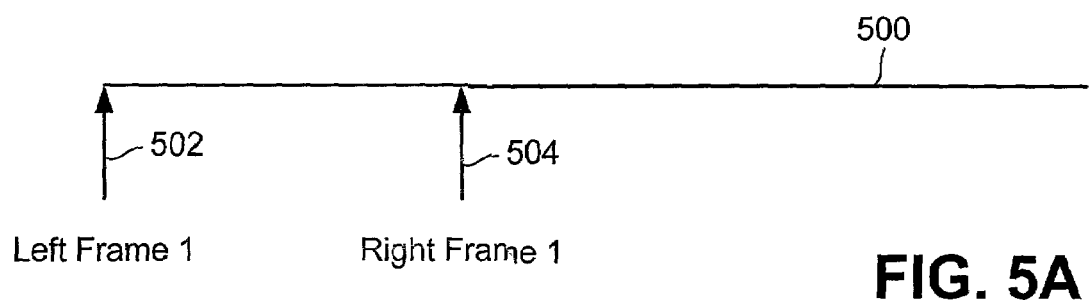
FIGS. 5A–5D illustrate line graphs depicting different pairs of frames that are used for shot boundary detection in embodiments of the invention.

In block 402, the shot boundary detector 130 initially sets the left frame to zero and sets the right frame to the step value. An example of this is illustrated in FIG. 5A, with line graph 500 representing a video segment, while arrows 502 and 504 represent the positions of the initial left and right frames (labeled "Left Frame 1" and "Right Frame 1"), respectively. In block 404, the shot boundary detector 130 determines whether it is at the end of the video. If so, the shot boundary detector 130 continues to block 406, otherwise, the shot boundary detector 130 continues to block 408.

In block 408, the shot boundary detector 130 determines whether a candidate flag has been set. The candidate flag is set by the shot boundary detector 130 when it identifies a pair of frames as being candidates for a shot boundary (i.e., either an abrupt break or a gradual transition). In one embodiment, the candidate flag is set to 1 if a candidate change has been found, and the candidate flat is set to 0 if a candidate change has not been found. Initially, the candidate flag is not set. If the candidate flag has been set, processing continues to block 422, otherwise, processing continues to block 410.

In block 410, the shot boundary detector 130 computes a first difference between the left frame and the right frame. In one embodiment, this first difference is computed with a partial block-based comparison technique. With the partial block-based comparison technique, the shot boundary detector 130 divides the left frame and the right frame into non-overlapping blocks (e.g., 100 blocks each). Then, the shot boundary detector 130 selects some corresponding blocks of each frame. Next, the shot boundary detector 130 computes an average pixel value for the selected blocks. By comparing the average pixel value for corresponding blocks, the shot boundary detector 130 is able to determine the first difference.

Figure 6:
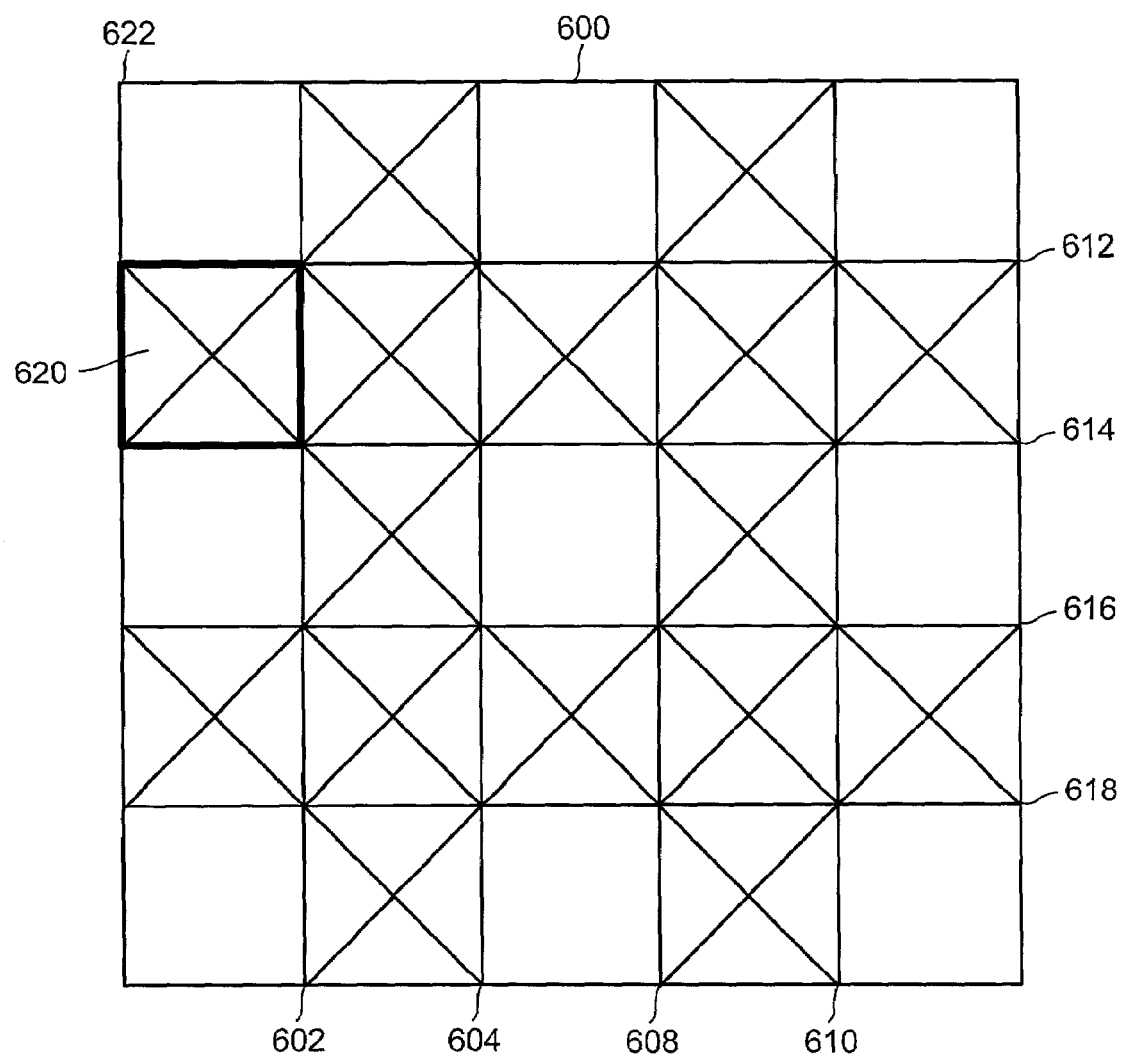
FIG. 6 illustrates an image partitioned in accordance with a partial block-based comparison technique in one embodiment of the invention.

There are many techniques for partitioning and selecting blocks, for example, every other block may be selected or some blocks maybe selected based on a probability theory. In one embodiment, the shot boundary detector 130 partitions an image using, for example, four equally spaced vertical and horizontal lines. FIG. 6 illustrates an image in a frame 600 partitioned in accordance with a partial block-based comparison technique in one embodiment of the invention. For example, the image is partitioned with four equally spaced vertical lines 602, 604, 608, and 610. The image is also partitioned with four equally spaced horizontal lines 612, 614, 616, and 618. One block is formed by the equally spaced vertical and horizontal lines and with the edges of the image 600. For example, block 620 is formed by edge 622, vertical line 602, and horizontal lines 612 and 614.

In alternative embodiments, the vertical and horizontal lines may be less than or more than 4 and may not be equally spaced. Also, in alternative embodiments, the number of vertical and horizontal lines may not be equal. In further embodiments, the lines may not be vertical or horizontal (e.g., diagonal lines may be used for partitioning). Block 620 is compared to a block in the same position (i.e., formed by the same edge and vertical and horizontal lines) in an image in another frame. In one embodiment, the shot boundary detector 130 does not actually draw vertical and/or horizontal lines on the image. In other embodiments, the shot boundary detector may, for example, make a copy of the image and draw vertical and/or horizontal lines on the image.

In one embodiment, once blocks are selected, the shot boundary detector 130 computes an average value of all the pixels in each block of each frame (i.e., an average RGB value). Each pixel has a value associated with it. For example, when an image represented with a two-dimensional array of RGB (red-green-blue) pixels, each pixel value is a vector of three numbers, representing red, green, and blue, respectively. Each red, green, and blue number may range from 0–255. For instance, a pixel value may be represented with a red, green, blue vector such as (0,0,0) or (200, 150, 220). A larger pixel value may be indicative of, for example, a brighter, more colorful pixel.

To obtain the average RGB value of a block, the shot boundary detector 130 obtains an average of the R value, an average of the G value, and an average of the B value. Equation (1) is used to obtain the average RGB value for a block having N (e.g., 100) pixels by calculating an average value for R, for G, and for B.

$$R = \frac{\left(\sum_{i=0}^{N} r_i\right)}{N} \quad (1)$$

$$G = \frac{\left(\sum_{i=0}^{N} g_i\right)}{N}$$

$$B = \frac{\left(\sum_{i=0}^{N} b_i\right)}{N}$$

Once the shot boundary detector 130 has obtained an average RGB value for each corresponding block, the shot boundary detector 130 compares the average RGB values. For example, a block in a first frame may have an average RGB value of (110, 150, 100), and a corresponding block in a second frame may have an average RGB value of (100, 100, 100). The shot boundary detector 130 determines that these blocks are different because the average RGB values are not similar. In one embodiment, because noise and other factors may affect the pixel values, the shot boundary detector 130 does not look for an exact match between average RGB values of corresponding blocks. In an alternative embodiment, the shot boundary detector 130 determines that two blocks are different if their average RGB values are not exact matches.

In one embodiment, the shout boundary detector 130 obtains the absolute value of the difference between the average RGB values of the first and second block. In one embodiment, if the result exceeds 15, the shot boundary detector 130 determines that the corresponding blocks are different. For example, the absolute value of the difference between the average RGB value of (110, 150, 100) first block and the average RGB value of (100, 100, 100) for a second block is (10, 50, 0). Since the G value exceeds 15, the shot boundary detector 130 determines that the first block and second block are different. On the other hand, if the average RGB value is (100, 150, 100) for the first block and the average RGB value is (110, 153, 90) for the second block, the shot boundary detector 130 determines that the absolute value of the difference between the average RGB values is (10, 3, 10). Since the R value, G value, and B value do not exceed 15, the shot boundary detector 130 determines that the first and second blocks are similar.

If many of the corresponding blocks (e.g., more than 25%) are different, the shot boundary detector determines that the left and right frames are different.

Thus, the first difference is a value that represents the number of corresponding blocks in two frames that are different. Two corresponding blocks are different if they have different average RGB values. For example, if twenty blocks are selected for comparison in each of two frames, and ten corresponding blocks are different in the two frames, then the shot boundary detector 130 sets the first difference to 10.

One form of the partial block-based comparison technique is described in "Automatic Video Data Structuring Through Shot Partitioning and Key-Frame Computing," Wei Xiong, John Chung-Mong Lee, and Rui-Hua Ma, Machine Vision and Applications, Springer-Verlag, 10: 51–65, 1997, which has been entirely incorporated by reference herein.

In block 412, the first difference is compared to a first threshold. In one embodiment, the first threshold is 25% of the total number of blocks selected for comparison using the partial block-based comparison technique (e.g., if there are 20 blocks selected for comparison, the first threshold is set to 5). For an abrupt break, a large difference is expected between frames. While for a gradual transition, a smaller difference is expected between frames. Since the first threshold is used to determine whether there is an abrupt break, rather than a gradual transition, the first threshold is typically set high.

Figure 5B:
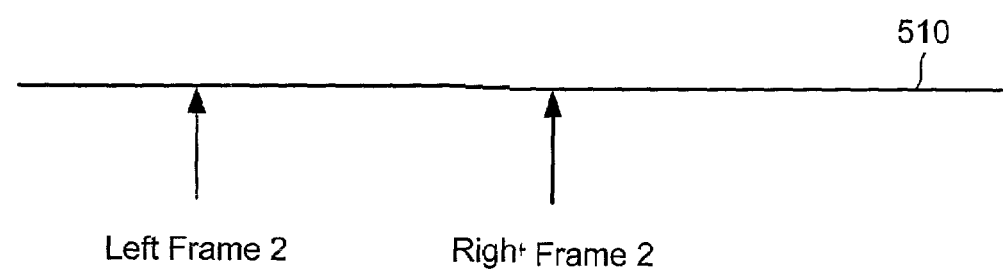

Continuing with the flow diagram, if the difference exceeds the threshold, then the shot boundary detector 130 determines that the left and right frames are candidates for a shot boundary and processing continues to block 416. Otherwise, the shot boundary detector 130 continues to block 414 and increments the left and right frame a half a step, as illustrated on line graph 520 in FIG. 5B.

In block 416, the shot boundary detector 130 sets a candidate flag to indicate that a candidate for a change in shots (i.e., a candidate for an abrupt break or gradual transition) has been detected. At this point, the pair of frames are designated as only candidates, rather than as a shot boundary, because these pair of frames may not actually be at a shot boundary. That is, the candidate frames may be distant from each other (i.e., not consecutive), and the shot boundary detector 130 then performs the step variable technique to precisely locate the consecutive frames that are at the shot boundary between the candidate frames. Additionally, the candidate frames may represent a false alarm. In block 417, the shot boundary detector 130 sets a candidate frame variable to the left frame's current value. This information may be used later to select a new frame in the video segment from which processing will be started to detect the next shot boundary.

In one embodiment, in block 418, the shot boundary detector 130 computes a color difference and an edge difference for the left and right frames. There are many factors in determining whether a color difference or an edge difference should be computed. For example, if two images contain an image with primarily one color, but several edges, then an edge difference may be computed. If two images contain a great deal of color, but few edges, then a color difference may be computed. In alternative embodiments, only a color difference or an edge difference is computed.

To determine the color difference, the shot boundary detector 130 generates a color histogram of all pixels for each frame, and then compares the histograms for differences. Each color histogram represents the relative frequency of occurrence of the various color values in the image captured by the frame for which the color histogram was generated. In one embodiment, if the color histograms are very different, then the shot boundary detector 130 determines that the left and right frames represent a shot boundary.

To determine the color histogram difference, let $H_f$ represent the color histogram function of image f in a frame in which each pixel is represented with a RGB vector. Equation (2) represents the color histogram function $H_f$.

$$H_f(r, g, b) = \frac{N_f(r, g, b)}{wh} \qquad (2)$$

The $N_f(r, g, b)$ function calculates the number of pixels with color value r, g, b, where r=0, 1, . . . 255, g=0, 1, . . . 255, and b=0, 1, . . . 255. Therefore, the $N_f(r, g, b)$ function is performed for $N_f(0, 0, 0)$, $N_f(0, 0, 1)$, . . . $N_f(255, 255, 255)$. That is, for each image, the shot boundary detector 130 counts how many pixels have a particular combination of RGB values. For example, in an image having 10 pixels, two pixels may have RGB value (0, 0, 0), one pixel may have RGB value (200, 150, 150), two pixels may have RGB value (100, 200, 150), and the remaining five pixels may have RGB value (0, 0, 255). In an alternative embodiment, r, g, and b may range from 0–255, but the shot boundary detector 130 may map the values to a different range, such as 0–63, and perform further processing with these mapped values. In yet another alternative embodiment, the shot boundary detector 130 converts RGB values for HSV (hue, saturation, and value of color) values and determines the color difference with the HSV values.

In equation (2), w is the width of image f, and h is the height of image f.

The color histogram difference of image $f_1$ in a first frame, and image $f_2$ in a second frame is computed in equation (3).

$$|H_{f1} - H_{f2}| = \sum_{r=0}^{255} \sum_{g=0}^{255} \sum_{b=0}^{255} |H_{f1}(r, g, b_s) - H_{f2}(r, g, b_s)| \qquad (3)$$

When the difference between $H_{f1}$ and $H_{f2}$ is large (e.g., the difference is greater than 0.10 when the histograms have been normalized), the shot boundary detector 130 determines that the first frame and the second frame form a border for a shot boundary.

Figure 3E:
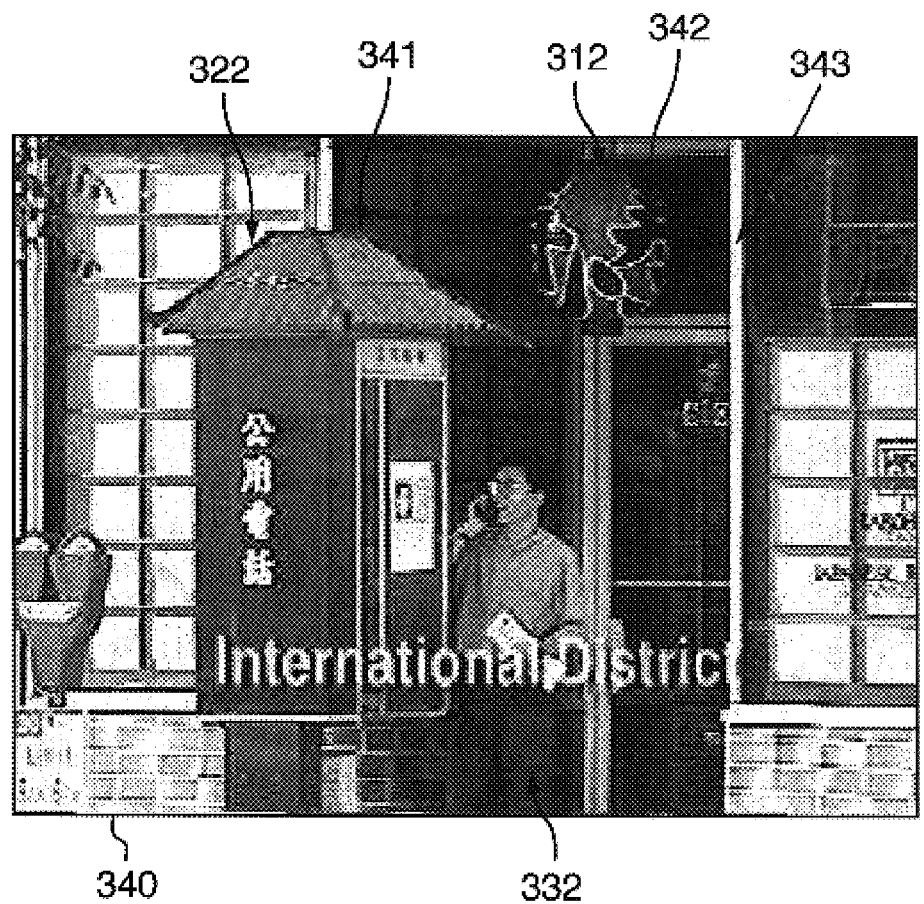

For edge detection, the shot boundary detector 130 computes edges in the left and right frames. Next, the shot boundary detector 130 generates an edge histogram for each frame. An edge histogram represents the relative frequency of occurrence of the various values of edge magnitudes and direction in the image captured by a frame. Then, the shot boundary detector 130 determines the differences between the frames using the edge histograms. For example, in FIG. 3A, the shot boundary detector 130 may identify edges 301, 302 and 303. In FIG. 3E, the shot boundary detector 130 may identify edges 341, 342, and 343. Then, the shot boundary detector 130 determines that the edges in the two shots are different by comparing the edge histograms. In one embodiment, if the edges between the frames are significantly different, then the shot boundary detector 130 determines that the left and right frames represent a shot boundary.

Equation (4) represents an edge histogram function $H_e$.

$$H_e(m, d) = \frac{N_e(m, d)}{wh} \quad (4)$$

An edge has a magnitude, m, and a direction, d. The magnitude represents how large the edge is. The direction represents its direction as horizontal, vertical, or at some definite angle (e.g., 30 degrees). The $N_e(m,d)$ function calculates the number of edges with a particular magnitude and direction value, wherein m ranges from, for example, 0–30, and d ranges from, for example 0–30. Therefore, the $N_e(m,d)$ function is performed for $N_e(0, 0)$, $N_e(0, 1)$, ... $N_e(30, 30)$.

To create the edge histogram, for each image, the shot boundary detector 130 counts how many edges have a particular combination of magnitude and direction values. For example, in an image having 5 edges, two edges may have a magnitude, direction value (0, 0), one pixel may have a magnitude, direction value (15, 0), and two pixels may have a magnitude, direction value (0, 30).

In equation (4), w is the width of image e, and h is the height of image e.

The edge histogram difference of image $e_1$ in a first frame, and image $e_2$ in a second frame is computed in equation (5).

$$|H_{e1} - H_{e2}| = \sum_{m=0}^{30} \sum_{d=0}^{30} |H_{e1}(m, d) - H_{e2}(m, d)| \quad (5)$$

When the difference between $H_{e1}$, and $H_{e2}$ is large (e.g., the difference is greater than 0.1 when the histograms have been normalized), the shot boundary detector 130 determines that the first frame and the second frame form a border for a shot boundary.

An edge is one type of feature that is used in one embodiment of the invention. Other types of features include, for example, a point, a line, and a region. In other embodiments, other features may be used to confirm that a change has occurred between two frames. Moreover, it is to be understood that the technique of the invention is applicable to any type of feature or distinguishing characteristic between frames.

Features may be selected using, for example, the Hough transform technique for line detection or the Kitchen-Rosenfeld technique for corner detection. For more information on the Hough transform technique, see "Fundamentals of Digital Image Processing," by Anil K. Jain, Prentice-Hall, Inc., page 362, 1989 or "Digital Image Processing," by Rafael C. Gonzalez and Richard E. Woods, page 432–438, each of which is entirely incorporated by reference herein. For more information on the Kitchen-Rosenfeld technique, see "*Gray-Level Corner Detection*," by L. Kitchen and A. Rosenfeld, Pattern Recognition Letters, 95–102, December, 1982, which is entirely incorporated by reference herein.

In block 420, the shot boundary detector 130 sets a break variable to true if the color difference or edge difference confirms that there is significant change. That is, the break variable is set to true if the color difference or the edge difference confirms that the left and right frames represent a candidate for change.

In block 422, the shot boundary detector 130 determines whether the left frame and the right frame are consecutive frames (i.e., right frame—left frame=1). If so, processing continues to block 424, otherwise, processing continues to block 440. In block 424, the shot boundary detector 130 computes a second difference between the left frame and right frame using the partial block-based comparison technique.

In block 426, the shot boundary detector 130 determines whether the second difference exceeds the first threshold, which is set to determine whether there is a large difference and which signals an abrupt break. If so, then processing continues to block 428, and the shot boundary detector 130 detects an abrupt break. Block 428 is followed by block 430. In block 430, the shot boundary detector 130 outputs the detected result. Block 430 is followed by block 432. In block 432, the shot boundary detector 130 increments the left and the right frame by half a step. Referring back to block 426, if the shot boundary detector 130 determines that the second difference does not exceed the first threshold, processing continues to block 434. In block 434, the shot boundary detector 130 determines whether the second difference exceeds a second threshold or that the break variable is set to true, which is set to determine whether there is a smaller difference than in the case of the abrupt break and which signals a gradual transition. In one embodiment, the second threshold is set at 116. If the second difference exceeds the second threshold or that the break variable is set to true, processing continues to block 436, and the shot boundary detector 130 detects a gradual transition. Block 436 is followed by block 430 described above.

Figure 7:
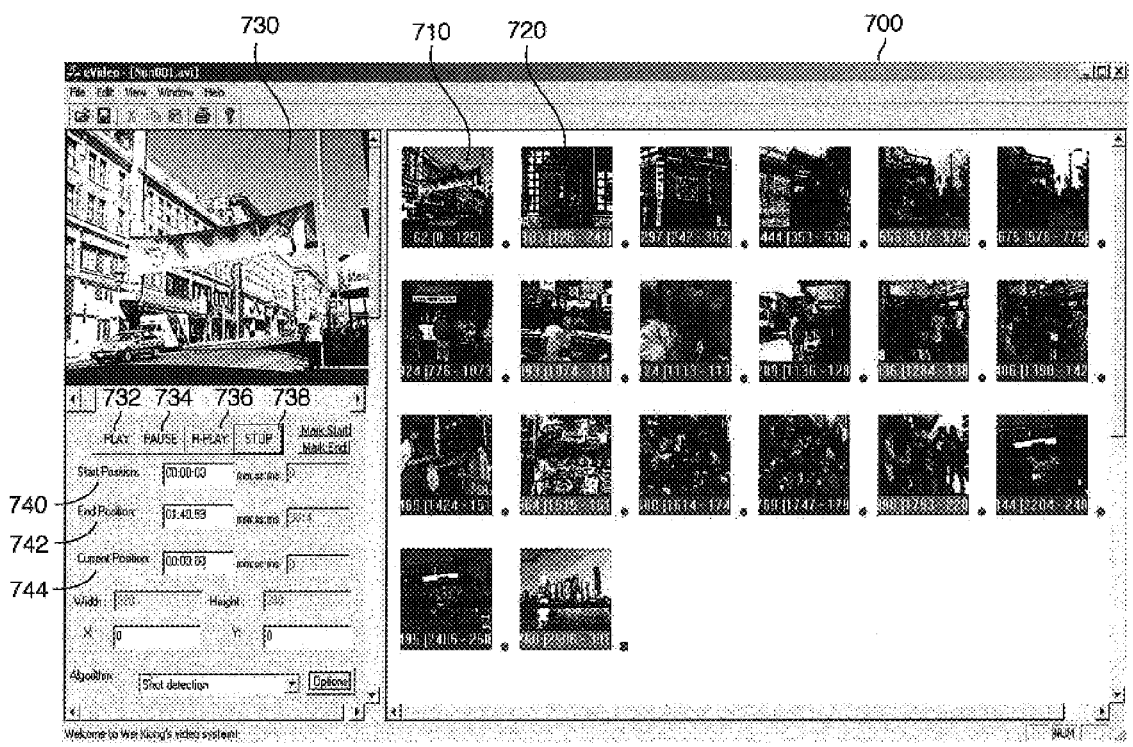
FIG. 7 illustrates a window displaying key frames for shot boundaries in one embodiment of the invention.

Once either an abrupt break or a gradual transition is detected, the shot boundary detector 130 outputs the detected result. In one embodiment, the left and right frames at the shot boundary are output. For example, frame 330 from FIG. 3D and frame 340 from FIG. 3E may be identified as the left and right frames at which a shot boundary is detected. Then, the shot boundary detector 130 may display them in a window 700 as frames 710 and 720, respectively, as is illustrated in FIG. 7. In one embodiment, the output display includes a video window 730 that enables viewing of a video by selection of Play 732, Pause 734, Replay 736, and Stop 738 buttons. The Start position 740 specifies the left frame position, while the End position 742 specifies the right frame position. The Current position 744 of the video in window 730 is also displayed.

Figure 5C:
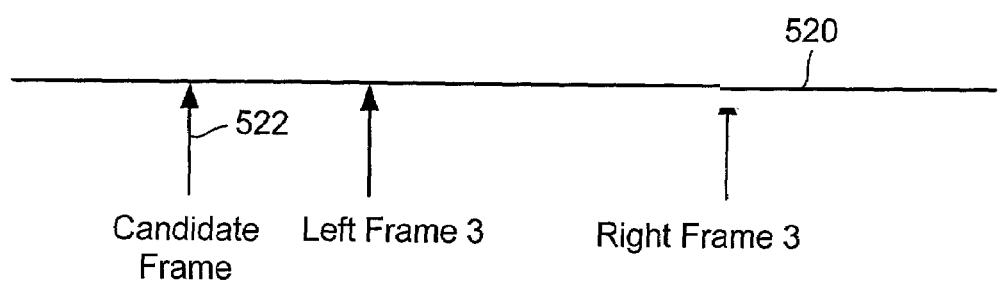

If the difference does not exceed the second threshold in block 434, processing continues to block 438. In block 438, the shot boundary detector 130 sets new positions for the left and right frames, and processing loops back to block 404 to continue identifying a shot boundary. The new position of the left frame is determined based on the saved candidate frame variable. In particular, the new position of the left frame is set to the value of the candidate frame variable and half of the step value (i.e., candidate frame+step/2). The new position of the right frame is set to the new position of the left frame plus the step value (i.e., left frame+step). FIG. 5C illustrates a line graph 520 in which the left frame and right frame are incremented based on the candidate frame 522, thus, they are to the right of the candidate frame in the video segment.

Figure 5D:
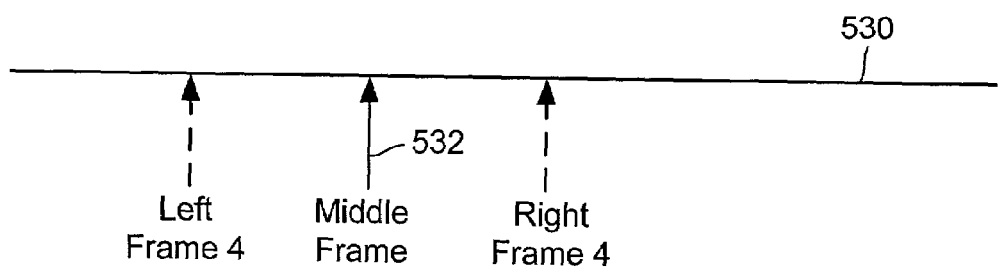

If the frames are not consecutive, processing continues to block 440. In block 440, the shot boundary detector 130 identifies a middle frame between the left frame and right frame. FIG. 5D illustrates a line graph 530 that includes a middle frame 532. The middle frame is in the middle of the portion of video segment bounded by the left and right frames (e.g., middle frame=(left frame+right frame)/2). In block 442, the shot boundary detector 130 computes the difference between the left frame and the middle frame, which is labeled as DLM, using the partial block-based comparison technique. In block 444, the shot boundary detector 130 computes the difference between the right frame and the middle frame, labeled as DRM, using the partial block-based comparison technique. In block 446, the shot boundary detector 130 determines whether there is a greater difference between the right and middle frames or between the left and middle frames (i.e., whether DRM is greater than DLM). If the difference between the right and middle frames is greater, then the left frame is set to the middle frame in block 448. Otherwise, the right frame is set to the middle frame in block 450. This helps narrow the range of frames in which the shot boundary may be detected. Then, processing loops back to block 404 to try to identify consecutive frames of a shot boundary.

In block 406, the shot boundary detector performs post-processing. In particular, the shot boundary detector 130 attempts to remove false alarms (i.e., detected shot boundaries that are not actually shot boundaries). In one embodiment, the shot boundary detector 130 checks the length of each shot defined by the detected shot boundaries, and, if the length of a shot is small (e.g., 40–50 frames), then, the shot boundary detector 130 treats the shot boundaries for that shot as a false alarm. The shot boundary frames representing the false alarms are removed from the set of output frames. Moreover, during post-processing, if the camera capturing the frames stores a date and time with each frame, the date and time may be used to confirm each detected shot boundary and remove false alarms. For example, for a given pair of consecutive frames of a shot boundary, if an abrupt break was detected with the first difference exceeding the first threshold by a large amount, the shot boundary is likely to be an actual shot boundary (i.e., not a false alarm). Likewise, for the pair of consecutive frames of a shot boundary, if a gradual transition was detected with the second difference exceeding the second threshold by a large amount, the shot boundary is likely to be an actual shot boundary. If the second difference does not exceed a threshold by a large amount, the shot boundary detector 130 may use the date and/or time of each consecutive frame to determine whether the shot boundary is a false alarm. In one embodiment, if the consecutive frames have different dates (e.g., they were captured on different days) or were captured at different times (e.g., more than 15 minutes apart), they the consecutive frames form a shot boundary. If the consecutive frames were taken on the same day and/or close in time (e.g., one second apart), the consecutive frames are determined to be false alarms by the shot boundary detector 130.

Therefore, the shot boundary detector 130 is able to identify shot boundaries in a video segment without processing all of the frames in the video segment. Moreover, by identifying candidates for shot boundaries and then using edge and/or color differences between frames to confirm whether a candidate is actually a shot boundary, the shot boundary detector 130 is able to identify and discard many false alarms. Thus, shot boundary detector 130 provides an efficient technique for detecting shot boundaries.

Microsoft and Windows 2000 are trademarks of Microsoft, Inc. of Redmond, Wash.

Although the invention has been described with reference to particular embodiments, the description is only an example of the invention's application and should not be taken as a limitation.

Additionally, the invention may be tangibly embodied as software in a computer-readable device or media, such as memory, data storage devices, and/or data communication devices, thereby making a product or article of manufacture according to the invention. As such, the terms "article of manufacture" and "computer program product" and "computer-readable storage medium" as used herein are intended to encompass software accessible from any computer readable device or media. Using the present specification, the invention may be implemented as a machine, process, or article of manufacture by using programming and/or engineering techniques to produce software, firmware, hardware, or any combination thereof.

Various other adaptations and combinations of features of the embodiments disclosed are within the scope of the invention as defined by the claims.

The invention claimed is:

1. A method for detecting a shot boundary, comprising:
   determining a first difference between a first frame and a second frame, wherein the first difference comprises a partial comparison between the first frame and the second frame;
   determining whether the first difference exceeds a threshold, wherein the first frame and the second frame comprise a border for a candidate shot boundary when the first difference exceeds the threshold; and
   when the first difference exceeds the threshold,
      computing at least one of an edge difference and a color difference between the first frame and the second frame;
      confirming whether the first frame and the second frame comprise a border for a candidate shot boundary based on the value of at least one of the edge difference and the color difference; and
      searching for a shot boundary between the first frame and the second frame.

2. The method of claim 1, further comprising:
   selecting the first frame and the second frame from a video segment.

3. The method of claim 2, further comprising:
   selecting the first frame and the second frame based on a predetermined value that is used to step through the video segment.

4. The method of claim 3, wherein the predetermined value is user defined.

5. The method of claim 3, wherein the predetermined value is set at a default value.

6. The method of claim 1, further comprising:
   when the first difference does not exceed the threshold, selecting third and fourth frames based on a predetermined value for stepping through a video segment.

7. The method of claim 1, when the first difference exceeds the threshold, further comprising:
   setting a candidate flag to indicate that the first frame and the second frame comprise a border for a candidate shot boundary.

8. The method of claim 7, further comprising:
   selecting a new first frame and a new second frame; and
   using the candidate flag to determine whether to compute a second difference between the new first frame and the new second frame.

9. The method of claim 1, when the first difference exceeds the threshold, further comprising:
  setting a candidate frame to the first frame.

10. The method of claim 1, wherein the partial comparison comprises:
  dividing the first frame and the second frame into blocks;
  selecting some corresponding blocks between the first frame and the second frame;
  determining whether the selected corresponding blocks are similar, wherein the first difference is a total number of the selected corresponding blocks that are different.

11. The method of claim 1, when it is determined that the first difference exceeds the threshold, further comprising:
  determining whether the first frame and the second frame are consecutive frames.

12. The method of claim 11, when it is determined that the first frame and second frame are not consecutive frames, further comprising:
  performing a binary search within the first frame and the second frame to locate consecutive frames that may comprise a shot boundary:
  computing a second difference between the consecutive frames.

13. The method of claim 12, further comprising:
  if the second difference exceeds the threshold, detecting an abrupt break.

14. The method of claim 12, wherein the threshold comprises a first threshold, further comprising:
  if the second difference does not exceed the first threshold, determining whether the second difference exceeds a second threshold or at least one of the color difference and the edge difference confirms the first frame and the second frame comprise a border for a candidate shot boundary; and
  if the second difference exceeds the second threshold or at least one of the color difference and the edge difference confirms the first frame and the second frame comprise a border for a candidate shot boundary, detecting a gradual transition.

15. The method of claim 14, wherein the second threshold is smaller than the first threshold.

16. The method of claim 14, further comprising:
  if the second difference does not exceed the second threshold or at least one of the color difference and the edge difference does not confirm the first frame and the second frame comprise a border for a candidate shot boundary, selecting a third frame and a fourth frame for processing to detect a shot boundary based on a previously selected candidate frame.

17. The method of claim 1, further comprising:
  performing post-processing to identity potential shot boundaries that are false alarms.

18. A method for detecting a shot boundary, comprising:
  determining a first difference between a first frame and a second frame;
  determining whether the first difference exceeds a threshold, wherein the first frame and the second frame comprise a border for a candidate shot boundary when the first difference exceeds the threshold; and
  when the first difference exceeds the threshold,
    computing at least one of an edge difference and a color difference between the first frame and the second frame; and
    confirming whether the first frame and the second frame comprise a border for a candidate shot boundary based on at least one of the edge difference and the color difference;
  determining whether the first frame and the second frame are consecutive frames;
  when the first frame and the second frame are not consecutive frames,
    selecting a middle frame between the first frame and the second frame;
    computing a second difference between the first frame and the middle frame;
    computing a third difference between the second frame and the middle frame; and
    determining a range of frames in which to search for a shot boundary based on whether the second difference is smaller than the third difference.

19. The method of claim 18, further comprising:
  when the second difference is smaller than the third difference, searching for a shot boundary using the middle frame and the second frame.

20. The method of claim 18, further comprising:
  when the second difference is greater than the third difference, searching for a shot boundary using the first frame and the middle frame.

21. A method for detecting a shot boundary, comprising:
  determining a first difference between a first frame and a second frame, wherein the first difference comprises a partial comparison between the first frame and the second frame;
  determining whether the first difference exceeds a threshold, wherein the first frame and the second frame comprise a border for a candidate shot boundary when the first difference exceeds the threshold;
  when the difference exceeds the threshold,
    computing an edge difference between the first frame and the second frame;
    confirming whether the first frame and the second frame comprise a border for a candidate shot boundary based on the edge difference; and
    searching for a shot boundary between the first frame and the second frame.

22. The method of claim 21, further comprising:
  setting a candidate flag to indicate that the first frame and the second frame comprise a border for a candidate shot boundary.

23. The method of claim 22, further comprising:
  selecting a new first frame and a new second frame; and
  using the candidate flag to determine whether to compute a second difference between the new first frame and the new second frame.

24. The method of claim 21, further comprising:
  selecting the first frame and the second frame based on a previously selected candidate frame.

25. The method of claim 21, wherein said computing an edge difference comprises:
  generating an edge histogram; and
  using the edge histogram to determine whether the first frame and the second frame comprise a possible border for a candidate shot boundary.

26. A method for detecting a shot boundary, comprising:
  determining a first difference between a first frame and a second frame, wherein the first difference comprises a partial comparison between the first frame and the second frame;
  determining whether the first difference exceeds a threshold, wherein the first frame and the second frame comprise a border for a candidate shot boundary when the first difference exceeds the threshold;

when the first difference exceeds the threshold,
  computing a color difference between the first frame and the second frame; and
  confirming whether the first frame and the second frame comprise a border for a candidate shot boundary based on the color difference; and
  searching for a shot boundary between the first frame and the second frame.

27. The method of claim 26, further comprising:
setting a candidate flag to indicate that the first frame and the second frame comprise a border for a candidate shot boundary.

28. The method of claim 27, further comprising:
selecting a new first frame and a new second frame; and
using the candidate flag to determine whether to compute a second difference between the new first frame and the new second frame.

29. The method of claim 26, further comprising:
selecting the first frame and the second frame based on a previously selected candidate frame.

30. The method of claim 26, wherein said computing a color difference comprises:
generating an color histogram; and
using the color histogram to determine whether the first frame and the second frame comprise a border for a candidate shot boundary.

31. A method for detecting a shot boundary, comprising:
computing a difference between a first frame and a distant frame, wherein the difference comprises a partial comparison between the first frame and the distant frame;
determining whether the first difference exceeds a threshold, wherein the first frame and the distant frame comprise a border for a candidate shot boundary when the difference exceeds the threshold;
if the difference exceeds the threshold,
  computing at least one of an edge difference and a color difference between the first frame and the distant frame;
  confirming whether the first frame and the distant frame comprises a border for a candidate shot boundary based on at least one of the edge difference and the color difference; and
  performing a binary search for a shot boundary between the first frame and the distant frame.

32. A system, comprising:
a computer including a processor and a memory;
a sequence of frames stored in the memory; and
a program comprising instructions stored in the memory of the computer, wherein the instructions are executed by the processor of the computer to:
  determine a difference between a first frame and a second frame, wherein the difference comprises a partial comparison between the first frame and the second frame;
  determine whether the difference exceeds a threshold, wherein the first frame and the second frame comprise a border for a candidate shot boundary when the difference exceeds the threshold; and
  when the difference exceeds the threshold,
    compute at least one of an edge difference and a color difference between the first frame and the second frame;
    confirm whether the first frame and the second frame comprise a border for a shot boundary based on the value of at least one of the edge difference and color difference; and
    searching for a shot boundary between the first frame and the second frame.

33. The system of claim 32, further comprising:
a video camera, wherein the sequence of frames is recorded with the video camera.

34. A system, comprising:
a computer including a processor and a memory;
a sequence of frames stored in the memory; and
a program comprising instructions stored in the memory of the computer, wherein the instructions are executed by the processor of the computer to:
  determine a first difference between a first frame and a second frame;
  determine whether the first difference exceeds a threshold, wherein the first frame and the second frame comprise a border for a candidate shot boundary when the first difference exceeds the threshold; and
  when the first difference exceeds the threshold,
    compute at least one of an edge difference and a color difference between the first frame and the second frame;
    confirm whether the first frame and the second frame comprise a border for a candidate shot boundary based on at least one of the edge difference and the color difference; and
    determine whether the first frame and the second frame are consecutive frames;
    when the first frame and the second frame are not consecutive frames,
      select a middle frame between the first frame and the second frame;
      compute a second difference between the first frame and the middle frame;
      compute a third difference between the second frame and the middle frame; and
      determine a range of frames in which to search for a shot boundary based on whether the second difference is smaller than the third difference.

* * * * *